(12) United States Patent
Blume et al.

(10) Patent No.: US 6,203,699 B1
(45) Date of Patent: Mar. 20, 2001

(54) FILTRATION MEMBRANE MODULE

(75) Inventors: Ingo Blume, Hengelo; Hendrik Dirk Willem Roesink, Borne; Petrus Cornelis Kamp, Zandvoort, all of (NL)

(73) Assignee: X-Flow B.V., Almelo (NL)

( * ) Notice: Subject to any disclaimer, the term of this patent is extended or adjusted under 35 U.S.C. 154(b) by 0 days.

(21) Appl. No.: 09/253,813

(22) Filed: Feb. 19, 1999

(30) Foreign Application Priority Data

Feb. 20, 1998 (NL) .................................................. 1008376

(51) Int. Cl.⁷ .............................. B01D 63/02; B01D 63/06
(52) U.S. Cl. ................................ 210/321.81; 210/321.9; 210/433.1
(58) Field of Search .......................... 210/433.1, 456, 210/321.78, 321.79, 321.8, 321.81, 321.87, 321.9, 321.88, 321.89; 422/44, 48

(56) References Cited

U.S. PATENT DOCUMENTS 4,749,551   6/1988   Borgione .

FOREIGN PATENT DOCUMENTS

| 492 045 | 7/1992 | (EP) . |
| 1 004 489 | 5/1998 | (NL) . |
| 96/08306 | 3/1996 | (WO) . |

Primary Examiner—John Kim
(74) Attorney, Agent, or Firm—Jeffrey D. Myers

(57) ABSTRACT

The invention relates to a capillary filtration membrane module, comprising a filter housing provided with an inlet, an outlet and a membrane compartment accommodating a bundle of capillary filtration membranes, the filtration membranes being cased at both ends of the membrane module in membrane holders, and the membrane compartment being provided with discharge conduits coupled to the outlet for the conveyance of the permeate. The discharge conduits comprise at least one discharge lamella and provided in the membrane compartment extending substantially in the longitudinal direction of the capillary filtration membrane.

5 Claims, 2 Drawing Sheets

FILTRATION MEMBRANE MODULE

The invention relates to a capillary filtration membrane module, comprising a filter housing provided with an inlet, an outlet and a membrane compartment accommodating a bundle of capillary filtration membranes, said filtration membranes being cased at both ends of the membrane module in membrane holders, and said membrane compartment being provided with discharge conduits coupled to the outlet for the conveyance of the permeate.

Such a filtration membrane module is disclosed in applicant's Dutch patent application NL-A-1,004,489. The discharge conduits in the form of discharge pipes described therein are a considerable improvement with respect to the conveyance of liquid that has passed through the membrane wall (the permeate), to the outlet of the membrane module. They largely, but not completely prevent extremely strong local flow currents that could damage or pinch the capillary membranes. In the crosswise direction of the module the discharge pipes take up much space at the expense of the number of capillary membranes that can be fitted into the membrane module. Fewer capillary membranes result in a reduced filtration capacity of the membrane module.

It is the object of the invention to eliminate the above-mentioned disadvantages. To this end the invention provides a filtration membrane module, characterized in that the discharge conduits comprise at least one discharge lamella provided in the membrane compartment and extending substantially in the longitudinal direction of the capillary filtration membrane.

The discharge lamellae can be made much thinner than the width of the known discharge pipes, at an equivalent discharge capacity, so that more capillary filtration membranes can be accommodated in the membrane module. The membrane module according to the invention has the further advantage that via the discharge lamellae the permeate flows even more evenly to the outlet than when using discharge pipes. In this way the forces exerted on the capillary filtration membranes will be distributed better. In addition, during periodic flushing to remove contamination from and/or off the membrane wall, which is performed by reversing the flow direction of the liquid, the capillary filtration membranes are flushed better and more evenly over their total length. This improves the cleaning of the membrane wall of the capillary filtration membrane, prolonging its service life and providing a better guarantee of maintaining the filtration capacity. Often chemicals are added to the flushing liquid to enhance the cleaning efficiency. The application of discharge lamellae results in a clearly improved discharge of said chemicals from the membrane module.

In order to attain a maximal discharge capacity, the length of the discharge lamellae is substantially equal to the length of the membrane compartment. This also promotes an even flow of permeate and flushing liquid in the membrane compartment.

In a preferred embodiment the discharge lamellae are corrugated, the corrugations extending substantially perpendicular to the longitudinal direction of the capillary filtration membranes. The corrugations may serve for the permeate's and the flushing liquid's discharge and supply respectively. The capillary filtration membranes will not fill the space within said corrugation, so that within the corrugation unhindered passage of permeate and flushing liquid to the outlet is provided.

The tops of the corrugations of the discharge lamellae directed toward the capillary filtration membrane are preferably substantially flat. In this way the capillary filtration membrane rest against the substantially flat portions of the discharge lamellae. Forces that the discharge lamellae exert during use on the capillary filtration membranes are in this manner distributed over a larger surface area, thereby reducing the chance of damaging or pinching the capillary filtration membranes.

In another possible embodiment, the discharge lamellae are double-walled, the walls being provided with at least one outlet opening to the membrane compartment. Permeate can now flow via the outlet openings into the space between the walls of the discharge lamellae, to be subsequently conveyed via said space toward the outlet. The walls will be substantially flat, so that forces exerted by the walls on the capillary filtration membranes are distributed over a large surface area and thus distributed better.

The invention will now be elucidated with reference to the appended drawings in which identical or similar parts are indicted by the same reference numbers, and in which.

Figure 1:
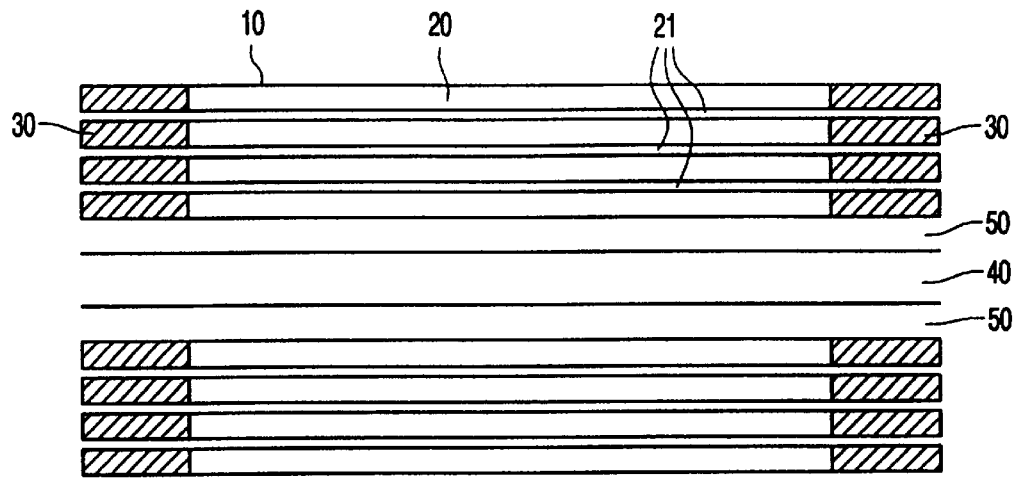
FIG. 1 is a longitudinal section of a filtration membrane module.

The embodiment of the capillary filtration membrane module shown in FIG. 1 comprises a filter housing 10 provided with a membrane compartment 20 accommodating a bundle of capillary filtration membranes 21. In practice, said capillary filtration membranes will usually be micro or ultrafiltration membranes. In the membrane compartment 20 a centrally located discharge compartment 40 is provided. Further, pipes are provided forming feed-through conduits 50 for the feed-through of liquid to be filtered to the other side of the membrane module. This is of advantage when different, serially connected membrane modules are provided in a pressure vessel. At the ends of the membrane module the capillary filtration membranes 21 are cased in membrane holders 30 which close off the space between the capillary filtration membranes 21, the filter housing 10, the discharge compartment 40 and the feed-through conduits 50. In the embodiment shown, the membrane holders 30 consist of a resin provided in the membrane module, in which the capillary filtration membranes 21 are imbedded. At least one end of the capillary filtration membranes has to be open.

Figure 2:
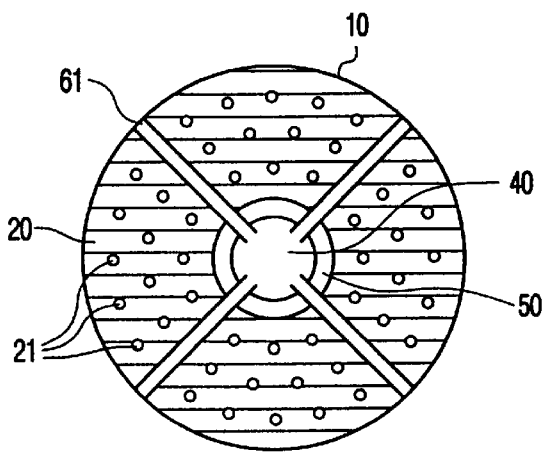
FIGS. 2 and 3 show a cross section of filtration membrane modules according to the invention having a corrugated and a double-walled discharge lamella respectively.
Figure 3:
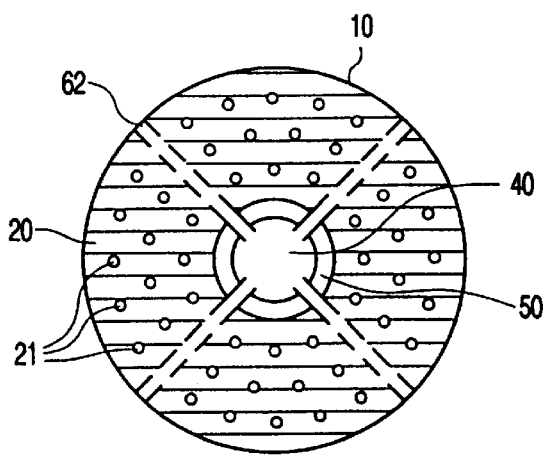

FIGS. 2 and 3 show two possible cross sections of the membrane module of FIG. 1. The figures show discharge lamellae 61 and 62 respectively. The space enclosed by the four illustrated feed-through conduits 50 forms the discharge compartment 40. As can be seen, the discharge lamellae are directed toward the outlet in the form of the discharge compartment 40, and extend approximately parallel to the capillary filtration membranes 21. The length of the discharge lamellae is substantially equal to the length of the membrane compartment 20, although the latter is not shown in the Figures.

Figure 4A:
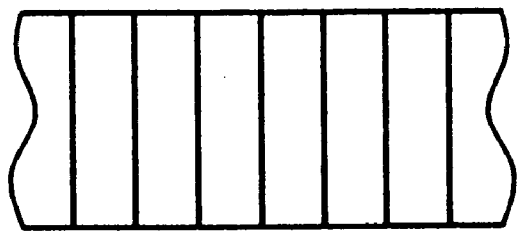
FIGS. 4a and 4b show a partial side view and a partial cross section respectively, of a corrugated discharge lamella.
Figure 4B:

In FIGS. 4a and 4b, the discharge lamellae 61 illustrated in FIG. 2 are shown as side view and cross section respectively. The discharge lamellae 61 are corrugated, with one corrugation running substantially perpendicular to the longitudinal direction of the capillary filtration membrane 21. In cross section, the corrugations have approximately a square wave pattern. Those portions of the corrugation coming into contact with the capillary filtration membrane, are flat. Any force exerted during use by the discharge lamellae on the capillary filtration membranes, is distributed over a considerable surface area of the discharge lamella. As a result, the chance of damaging or pinching the capillary filtration membranes is very slight. In order to further reduce this possibility, the transition between a longitudinal portion of the corrugation and a crosswise portion is rounded.

Figure 5A:
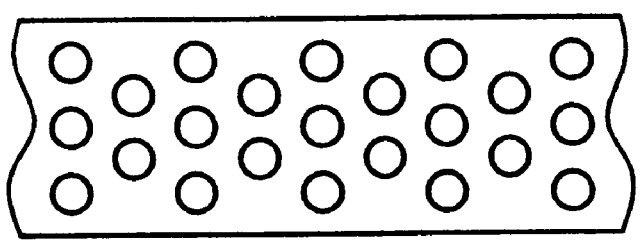
FIGS. 5a and 5b show a partial side view and a partial cross section respectively, of a double-walled discharge lamella.
Figure 5B:
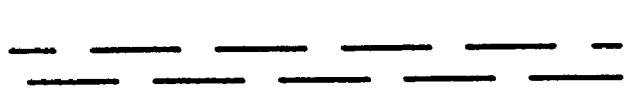

In FIGS. 5a and 5b the discharge lamellae 62 of FIG. 3 are shown as a side view and cross section respectively. Said discharge lamellae are double-walled, and the walls are provided with outlet openings to the membrane compartment. In the discharge lamellae 62 the capillary filtration membrane 21 in the membrane compartment also rest against the substantially flat portions of the discharge lamellae 62, in order to prevent damage and pinching of the capillary filtration membrane 21. Between their walls, the discharge lamellae 62 are provided with coupling elements (not shown) for holding the two walls together to form a whole.

The distribution and shape of the outlet openings may be different to those shown in FIG. 5. To increase the discharging area of the discharge lamellae 62 in the form of outlet openings in the embodiment shown, one may, for example, provide more or larger outlet openings directed toward the outside of the membrane module. The number of capillary filtration membranes increases in the outward direction of the membrane module; a larger discharging area at the respective side of the discharge lamellae could therefore be useful.

The whole assembly of the feed-through conduits and discharge lamellae as shown in the embodiment may be assembled during manufacture by, for example, fixing the pipes that form the feed-through conduits around rings with the aid of fastening means which are known as such, such that a groove is formed between the individual feed-through conduits. The discharge lamellae can then be clampingly inserted into said grooves. It is essential, however, to form an open communication through the groove, from the membrane compartment to the discharge compartment. In the case of the corrugated discharge lamella 61, the open communication is formed by the inside of the corrugations; in the case of the double-walled discharge lamella 62, the open communication is formed by the space between the walls of the discharge lamella and the outlet openings in the walls.

It should be noted, that it is also possible to use a single-walled, completely flat discharge lamella, as long as an open communication through the groove is created. In the case of the flat lamella, this may be accomplished by strategically placing spacers on the discharge lamella, or inside the groove on the pipes of the feed-through conduit.

It is not necessary to provide a central discharge compartment. Said discharge compartment may, for example, also consist of pipes distributed within the membrane compartment, or may be arranged annularly or otherwise at the outside of the membrane compartment. Likewise, it is not necessary to provide feed-through conduits.

During use, the liquid to be filtered flows into the capillary filtration membranes 21. Via the discharge lamellae 61 or 62, the liquid passing the membrane wall, the permeate, now enters the discharge compartment 40 whence it can be conveyed further. In the case of the discharge lamellae 61, the permeate is conveyed through the corrugation; in the case of the discharge lamellae 62, the permeate is conveyed through the outlet openings and the space between the double-walled lamellae. The permeate now flows extremely evenly from the capillary filtration membranes 21 into the direction of the discharge lamellae, without strong local flow currents.

Periodic flushing of the membrane wall is performed by reversed liquid flow. Flushing liquid is now supplied via the discharge compartment and is conveyed via the discharge lamellae to the membrane compartment. The liquid will now pass through the membrane wall from the outside to the inside of the capillary filtration membrane, carrying with it contamination left behind in and/or on the membrane wall. When using the discharge lamellae, the supply of flushing liquid is extremely even over the entire length of the capillary filtration membrane, without strong local flow currents or swirlings.

The filter housing, the discharge compartment, the feed-through conduits, the lamellae and the like have to be manufactured from a material that is inert to the liquid to be filtered. This material may, for example, be a plastic such as PVC or nylon, but a metal or other material is also possible. Generally, however, a suitable plastic is preferred, since this can be processed more easily and cheaper.

The embodiments described above must not be understood as restricting the invention. The filtration membrane module may be realized in a variety of embodiments, all within the scope of the present invention and the appended claims.

What is claimed is:

1. A capillary filtration membrane module comprising a filter housing comprising an inlet, an outlet and a membrane compartment accommodating a bundle of capillary filtration membranes, said filtration membranes being cased at both ends of the membrane module in membrane holders, and said membrane compartment comprising discharge conduits coupled to the outlet for conveyance of permeate, wherein the discharge conduits comprise at least one discharge lamella extending substantially in the longitudinal direction of the capillary filtration membranes.

2. A capillary filtration membrane module according to claim 1 wherein a length of the discharge lamellae is substantially equal to a length of the membrane compartment.

3. A capillary filtration membrane module according to claim 1 wherein the discharge lamellae comprise corrugations the corrugations extending substantially perpendicularly to a longitudinal direction of the capillary filtration membranes.

4. A capillary filtration membrane module according to claim 3 wherein tops of the corrugations of the discharge lamellae directed toward the capillary filtration membrane are substantially flat.

5. A capillary filtration membrane module according to claim 1 wherein the discharge lamellae are double-walled, the walls comprising at least one outlet opening to the membrane compartment.

* * * * *